United States Patent [19]

Gottlieb

[11] 4,141,616
[45] Feb. 27, 1979

[54] UNITIZED CONNECTOR ARRANGEMENT FOR ELECTRICAL APPARATUS

[75] Inventor: Ellis J. Gottlieb, Ft. Lauderdale, Fla.

[73] Assignee: Motorola, Inc., Schaumburg, Ill.

[21] Appl. No.: 850,515

[22] Filed: Nov. 11, 1977

[51] Int. Cl.² ............................................ H01R 13/54
[52] U.S. Cl. .................................. 339/75 M; 320/2; 339/91 R
[58] Field of Search ................... 339/75 R, 75 M, 79, 339/91 R; 325/316, 352, 353, 356, 361; 200/51.09; 320/2

[56] References Cited

U.S. PATENT DOCUMENTS

| 3,636,499 | 1/1972 | Winklebleck | 339/75 MP |
| 3,644,873 | 2/1972 | Dalton et al. | 339/79 |
| 3,917,372 | 11/1975 | Selinko | 339/75 M |

Primary Examiner—Roy Lake
Assistant Examiner—E. F. Desmond
Attorney, Agent, or Firm—Margaret Marsh Parker; James W. Gillman

[57] ABSTRACT

A connecting and latching mechanism in an electronic apparatus is activated by a portion of the housing of a complementary electronic device as it is inserted for interconnection and charging. Varying sizes of devices can be accommodated. Three rotatable elements, two pawls and a connector arm, are mounted on a single base plate. One pawl keeps the connector arm from being damaged before device insertion and helps position the device upon insertion. A connector block on the connector arm is rotated into position for contacting the terminals of the device by a second portion of the device housing. When the connector block is in full contact with the terminals, the connector arm is latched by another pawl. A lock must be deactivated by key or manually operated button to release the latching pawl, the connector arm and the inserted device. Rotatable charging contacts provide scouring motion at the contact points and also accommodate devices of varying lengths.

12 Claims, 7 Drawing Figures

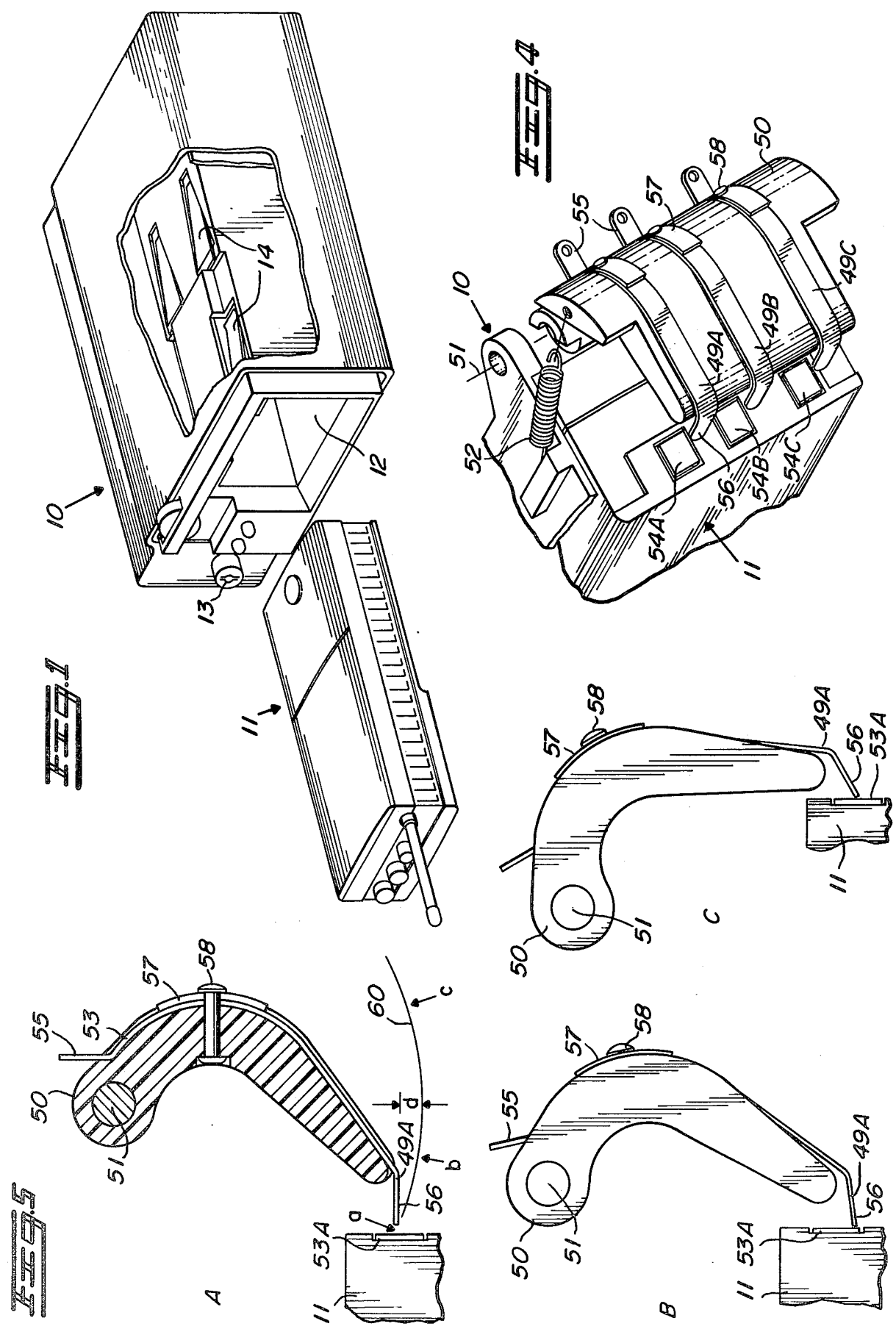

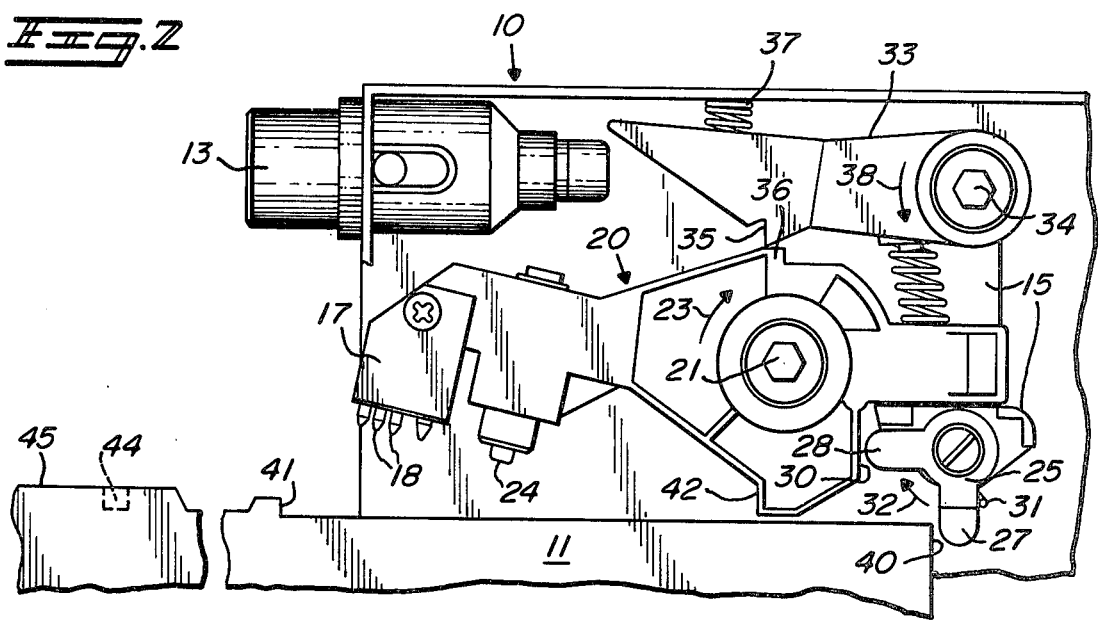
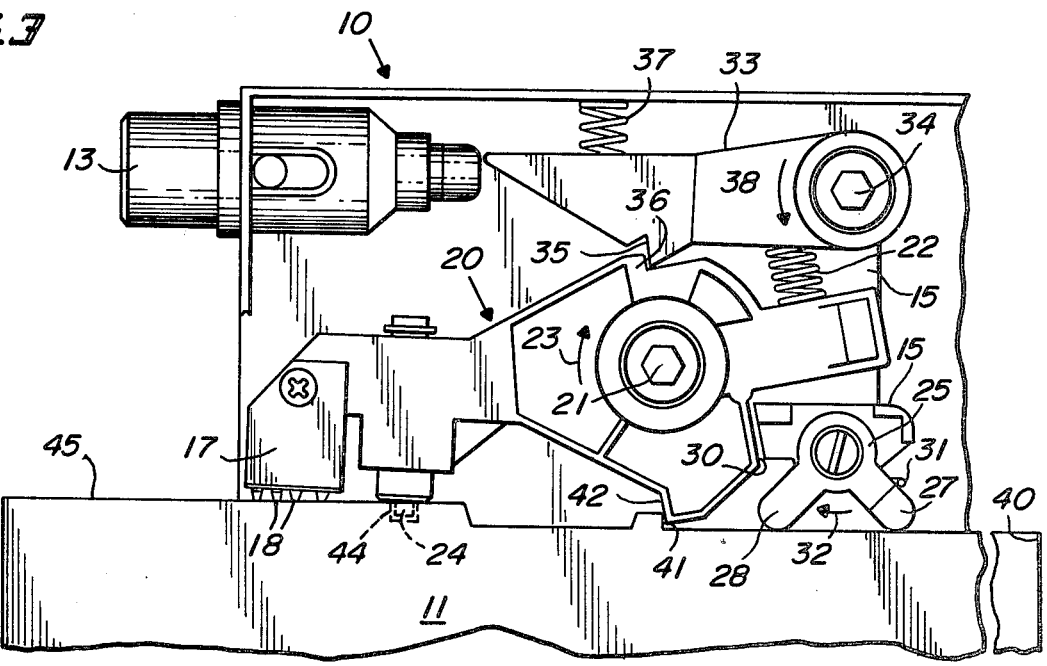

UNITIZED CONNECTOR ARRANGEMENT FOR ELECTRICAL APPARATUS

BACKGROUND OF THE INVENTION

Many arrangements are known for accommodating and connecting to inserted electronic devices, and some of these are adaptable to devices of varying sizes. Some have contacts which are exposed and simply make abutting contact as the device is inserted, but this type is very susceptible to accidental damage. Some arrangements have contacts mounted in a sliding sleeve which is engaged by the unit during insertion. Then, as the sleeve is driven inward by further insertion, cam surfaces and cam followers push the contacts toward the mating elements. Such devices can be completely satisfactory, but require a great deal of precision both in the manufacture of the individual parts and in their assembly. It would be an advantage to have an arrangement which could be completely assembled as a separate unit, then installed in the apparatus, and which would be self-locating in relation to the complementary device. Where devices are handled frequently, and occasionally mishandled, such as portable radios in public safety work, it is highly desirable to provide charging contacts which slide on the mating contacts, thereby providing self-cleaning capability. It is also desirable to accommodate devices of different dimensions.

SUMMARY OF THE INVENTION

It is therefore an object of the present invention to provide an improved connector arrangement for an electronic apparatus.

It is a particular object to provide a unitary connector arrangement which is easy to assemble and is not easily damaged.

It is another particular object to provide an arrangement which is self-positioning, self-locking, and has sliding contacts for the charging current.

These and other objects are obtained in an arrangement according to the invention and within an electronic apparatus for receiving and connecting to an inserted electronic device. The receiving area of the apparatus includes means for accommodating and retaining devices of different dimensions. A support member is mounted within the housing and adjacent the receiving area in the apparatus. On the support member are mounted an arm member which includes contacts and which is caused to rotate by insertion of the electronic device, a mechanism for enabling or disenabling rotation of the arm and which is also activated by insertion of the device, and a latch for engaging a portion of the arm to prevent rotation thereof while the device is in the apparatus. The enabling mechanism may be rotatably mounted and have a first portion which is engaged by a portion of the device housing and is thereby moved out of the path of the device during insertion. A second portion of the enabling mechanism is at the same time moved away from abutment with a portion of the connector arm, thus allowing the arm to rotate. The enabling mechanism also cooperates with leaf springs to position devices of different cross-sections in relation to the connector arm contacts. The latch has a projecting portion for engaging a shoulder portion of the connector arm when the contacts have made connection with the electronic device. The latch must be released, by a key or otherwise, in order for the connector arm to disengage from the inserted device and for the device to be removed from the apparatus.

Charging contacts in the apparatus are mounted on a rotatable bar to provide both length-adjustable charging current connection and a scouring action for cleaning the device contacts.

BRIEF DESCRIPTION OF THE DRAWING

FIG. 1 is a partially cut-away, perspective view of an electronic apparatus with the device to be inserted.

FIG. 2 is a top view of the mechanism in the unengaged position.

FIG. 3 is a top view of the mechanism of FIG. 2 in the engaged position.

FIG. 4 is a perspective view of the adjustable contacts of the apparatus.

FIGS. 5A, 5B and 5C are views of the contacts of FIG. 4 in three positions.

DETAILED DESCRIPTION OF A PREFERRED EMBODIMENT

In FIG. 1 an electronic apparatus referenced generally as numeral 10 is shown in a perspective view with an electronic communications device referenced generally as reference numeral 11 about to be inserted into a receiving area 12 of the apparatus 10. As an example, the device 11 might be a portable radio of the type carried by a public safety officer and the apparatus 10 might be a mobile converter/charging device mounted in a vehicle. Since the device 11 would typically operate on small, self-contained batteries, it would be desirable whenever possible to operate the device 11 from the power supply in the vehicle. It may also be desirable to charge the self-contained batteries at frequent intervals and also to operate the inserted communications device in conjunction with components mounted within the car such as a microphone, speaker or antenna. Thus a user of the device 11 will frequently return to his vehicle and insert the device 11 into the apparatus 10 for such operation. Since it is apparent that a number of contacts must be made with circuitry within the apparatus 10, means must be provided for such connections but the connectors in the apparatus 10 should not be vulnerable to damage from any other object which might be inserted into the receiving area 12. Thus the connections which must be inserted into the device 11 are apart from the receiving area until the device 11 is inserted. It is also desirable to provide some method for retaining the device 11 within the apparatus 10, not only during operation of the device 11, but preferably with some anti-theft means for locking the device 11 within the apparatus 10 when the user leaves the vehicle. In FIG. 1 a key lock 13 is shown adjacent the receiving area 12 for this purpose. As long as the user remains within his vehicle, the device 11 will merely be latched within the apparatus 10 and will require only depression of the key lock 13 for release of the device 11. If the user leaves the vehicle he can lock the key lock 13 and remove the key (not shown), thus preventing unauthorized removal of the device 11. As may be seen in the cut-away area of the apparatus 10, the receiving area 12 includes leaf springs 14 which make it possible to accommodate devices 11 of slightly different thicknesses. The springs 14 will position the contacts of the device 11 relative to the contacts of the apparatus 10 and will help shock mount the inserted device. Such devices typically vary only in the size and weight as a function of larger battery capacity it is to be seen that a heavier (and thus larger) device will compress the leaf springs 14 more, and thus the springs 14 will exert more force on the device.

FIG. 2 shows the connector arrangement of the apparatus 10 in a top view as it would appear before the device 11 has been fully inserted. Three main components of the arrangement are mounted on a base member 15 and the entire arrangement can be checked for operational and dimensional requirements before mounting the assembly in the apparatus 10. A connector block 17 containing a number of spring loaded contactors 18 is mounted on an end of a connector arm 20. The connector arm 20 is mounted for rotation around the point 21 on the base member 15 and is biased by a compression spring 22 into the position shown in FIG. 2 as indicated by an arrow 23. Also mounted on the connector arm 20 and adjacent to the connector block 17, is a locating pin 24 which is spring loaded (spring not shown). Adjacent one portion of the opposite end of the connector arm 20 is an enabling pawl 25 which rotates around a point 26, also affixed to the base member 15. The enabling pawl 25 has two projections 27, 28. In the position of FIG. 2, the first projection 27 on the pawl 25 projects into the receiving area of the apparatus 10 and the second projection 28 abuts a shoulder portion 30 of the connector arm 20. It will be seen that the projection 28 will prevent counter-clockwise rotation of the connector arm 20. The enabling pawl 25 is biased by a torsion spring 31 (end visible) into the position of FIG. 1 as indicated by an arrow 32.

A latching pawl 33 is also mounted on the base member 15 and rotates around the point 34. When the connector arm 20 is in the position of FIG. 2, a shoulder portion 35 of the latching pawl 33 rides on a shoulder portion 36 of the connector arm 20. The latching pawl 33 is biased against the connector arm 20 by a compression spring 37 as indicated by an arrow 38.

As shown in FIG. 3, the corner 40 of the device housing has engaged the first projection 27 of the enabling pawl 25, rotating the pawl 25 in the counter-clockwise direction against the spring 31. As the projection 28 of the enabling pawl 25 releases the shoulder portion 30 of the connector arm 20, the connector arm 20 would be free to move were it not for the biasing spring 22. As the electronic device 11 is further inserted into the receiving area 12 of the apparatus 10, a shoulder portion 41 of the housing of the device 11 engages a shoulder portion 42 of the connector arm 20, causing it to rotate in a counter-clockwise direction, bringing the locating pin 24 toward the device housing and, upon insertion of the pin 24 into an aperture 44, the contactors 18 contact terminals (not shown) on the side of the device 11. Some of the terminals may be spring loaded. As the connector arm 20 rotates through an angle of some 12°, the shoulder 36 of the connector arm passes the shoulder 35 of the latching pawl 33 in the counter-clockwise direction, whereupon the latching pawl rotates counter-clockwise through approximately 6°, biased by the spring 37. The latching pawl thus prevents any return rotation of the connector arm 20 in the clockwise direction until the latching pawl is released by depression of the lock/button 13.

As may be seen from FIGS. 2 and 3, the device 11 could have varying dimensions as to total length, since length is not a critical dimension as regards the connector arm arrangement. Since such devices typically have charging terminals on the first inserted end of the device, provision must be made for length adaptability at this point.

As may be seen in the view of FIG. 4, charging current contacts 49 in the apparatus are mounted on a pivotable actuator bar 50 which rotates around a point 51. It is to be noted that although three contacts 49 are shown in FIG. 4, the invention is not limited to any specific number. The contact bar 50 may be spring loaded by one or more coil springs 52, or otherwise biased toward the front of the apparatus 10. The springs 52 are strong enough to ensure good contacts and to assist in ejection of the device 11 when unlatched. The contacts 49A, 49B and 49C mounted on the contact bar 50 make sliding contact with charging contacts 53A, 53B and 53C, respectively, in the device 11 as may be seen in FIGS. 5A, 5B and 5C.

FIGS. 5A, 5B and 5C show three side views (5A is a cutaway view) of one contact 49A on the contact bar 50 with its construction and illustrating the sliding contact and length adjustability of the contacts 49A–C. The contact bar 50 is formed of an insulating material such as a molded plastic, with a groove 53 in for each of the contacts 49. The contacts 49 would be of a resilient, low resistivity metal such as phosphor bronze, with a portion 55 for lead attachment extending upward from the contact bar grooves 53 and an end portion 56 extending forward for contact with one of the contacts 53. Against each of the contacts 49A–C would be a metal back-up portion 57 for added strength and rigidity at this point and the contact portion 49 and metal back-up 57 would be held to the contact bar 50 by a fastener such as a rivet 58. The contact bar 50 and contact 49A will be in the position shown in FIG. 5A when the device 11 has not been fully inserted into the apparatus 10. Thus, the end portion 56 will first contact the point marked a. In contrast to previous sliding contacts, wherein the relative motion of the two mating surfaces is almost entirely parallel motion, the contacts 49 meet the contacts 53 "head-on"; i.e., the tip of the end portion 56 is contacted and moved back by the contact 53. As the contact 49 is sprung back, partially out of the groove 53 against the force applied by the back-up portion 57 (see FIGS. 5B and 5C). As the device 11 is fully inserted, the contact 49 causes the bar 50 to rotate, and as seen in the drawing, a "scouring" or "scraping" action is provided between the mating contact points rather than mere sliding action.

As seen in FIG. 5B, the contacts 49 are dimensioned so that the shortest device 11 used with the apparatus 10 would force the contact portion 56 back to the point b causing the bar 50 to rotate and the contact portion 56 to slide through the dimension d on the contact 53. As previously stated, the device 11 is typically a portable device, and as such the contacts 53 are susceptible to contamination as, for example, by the device 11 being dropped on the ground. It is therefore very desirable for the charging current contacts to make a cleaning or scouring contact when the device 11 is inserted into the apparatus 10. In this embodiment, the contact portion 56 will scrape on the contact 53A, approximately 3/32 inch. However, as seen in FIG. 5C, if the device 11 is a longer device, it will cause the contact 53A to move farther along the arc 60, as far as the point c. The contact 49A at this point has slid slightly further than 3/32 on contact 53A and it has returned to approximately the same position relative to the contact 53A as shown in FIG. 5B. It is to be noted that all dimensions given herein are merely exemplary and are given by way of illustration.

Thus there has been shown and described an arrangement for releasably retaining a small portable electronic device within a fixed or mobile apparatus. Insertion of the device enables a connector arm in the apparatus to bring the interconnecting contacts into an accurately aligned position with the corresponding connections on the device. A latching point is latched by rotation of the connector arm and prevents the connector arm from disengaging from the device until a key/manual release button is activated. The device, being wholly within the apparatus when latched, cannot be removed until the release button is activated. Pivotable contacts on the apparatus provide self-cleaning contact with the charging terminals of the device, and can accommodate a range of lengths of devices having all other dimensions identical. Springs in the apparatus help position and retain the device within the apparatus.

What is claimed is:

1. A connector arrangement for an electronic apparatus having means for receiving an inserted electronic device, the arrangement comprising in combination:

an arm member rotatably mounted and biased into a first position in the apparatus and including contact means, positioning means for positioning the inserted device relative to the contact means, and first and second shoulder portions, the first shoulder portion engaging a projecting portion of the inserted device, as the device is inserted, for causing rotation of the arm member into a second position, said rotation bringing the positioning means and, subsequently, the contact means into engagement with mating contact portions of the inserted device;

enabling means having a first position for preventing rotation of the arm member, and movable by insertion of the electronic device to a second position wherein the arm member is able to rotate, the enabling means being biased into said first position; and latching means having a projecting portion for engaging the second shoulder portion of the arm member for releasably retaining the arm member in the second position.

2. A connector arrangement according to claim 1 and further including a support member mounted within the apparatus, and wherein the arm member, enabling means and latching means are mounted on the support member.

3. A connector arrangement according to claim 1 and wherein the arm member comprises a lever and wherein the distance from the axis of rotation of the arm member to the first shoulder portion forms a first lever arm portion and the distance from the axis of rotation to the contact means forms a second lever arm portion, the second lever arm portion being longer than the first lever arm portion.

4. A connector arrangement in accordance with claim 1 and further including locking means mounted on the apparatus for releasing the latching means from a latched condition.

5. A connector arrangement in accordance with claim 1 and wherein the enabling means is rotatably mounted on the support member.

6. A connector arrangement in accordance with claim 5 and wherein the enabling means has first and second extended portions, the first portion being engaged and moved from the first position by a portion of the inserted device, the second portion being simultaneously moved from the first portion, thereby allowing the arm member to rotate.

7. A connector arrangement in accordance with claim 1 and wherein the enabling means and the latching means are rotatably mounted.

8. A connector arrangement for an electronic apparatus having means for receiving an inserted electronic device, the arrangement comprising in combination:

first contact means for connecting operating circuitry of the inserted device to operating circuitry of the apparatus, the contact means providing a locking function for the device within the apparatus;

second contact means for connecting charging circuitry of the inserted device to a corresponding charging current source in the apparatus; and means for biasing an inserted device against an inner portion of the apparatus.

9. A connector arrangement in accordance with claim 8 and wherein the first contact means includes fixedly retained contacts on a rotatably mounted arm member, means for retaining the arm member in a first inoperative position when no device is inserted into the apparatus, and for enabling rotation of the arm member to a second operative position upon device insertion.

10. A connector arrangement in accordance with claim 9 and further including latching means for retaining the arm member in the second position and means for releasing the latching means.

11. A connector arrangement in accordance with claim 10 and further including key means for enabling the releasing means.

12. A connector arrangement for an electronic apparatus having means for receiving an inserted electronic device, the arrangement comprising in combination:

contact means rotatably mounted within the apparatus in the path of the device for mating with contact means on the first inserted surface of the inserted device, the contact means of the apparatus being biased into a position substantially perpendicular to the contact means of the device, as the device is being inserted and the inward movement of the device contacts against the apparatus contacts causing rotation of the apparatus contact means for causing scraping motion by the apparatus contacts on the device contacts.

* * * * *